United States Patent [19]

Dobbs

[11] 4,087,251

[45] May 2, 1978

[54] FAT RECOVERY SYSTEM

[75] Inventor: James Cary Dobbs, Yakima, Wash.

[73] Assignee: George H. Elliott Company, Chicago, Ill.

[21] Appl. No.: 687,326

[22] Filed: May 17, 1976

[51] Int. Cl.[2] .......................... B01D 43/00; C11B 1/16

[52] U.S. Cl. .......................... 23/280; 260/412.6

[58] Field of Search .......................... 23/280; 260/412.6; 100/117

[56] References Cited

U.S. PATENT DOCUMENTS

| | | | |
|---|---|---|---|
| 2,667,500 | 1/1954 | Mortenson | 23/280 X |
| 3,180,880 | 4/1965 | Harrison et al. | 23/280 X |
| 3,398,677 | 8/1968 | Theobald et al. | 100/117 X |
| 3,410,882 | 11/1968 | Macy et al. | 23/280 |
| 3,412,671 | 11/1968 | Merlis | 23/280 X |
| 3,471,534 | 10/1969 | Jones | 23/280 X |
| 3,538,973 | 11/1970 | Levin | 23/280 X |

*Primary Examiner*—Morris O. Wolk
*Assistant Examiner*—Roger F. Phillips
*Attorney, Agent, or Firm*—Dominik, Knechtel, Godula & Demeur

[57] ABSTRACT

A fat recovery system for hide fleshings and trimmings is disclosed having a grinder for comminuting the fleshings and trimmings, the same being oriented to deliver its parts into a cooker having a steam jacket tube with an interior screw conveyor. After the particulate material has passed through the cooker, a drum type rotary screen is provided from which fat will drop, and the particulate materials pass into a press. Thereafter the solid particulates are removed and the liquid products are delivered into a settling vessel which is heated by steam pipes. Optionally, a drying tank may also be provided. The method of the subject invention essentially includes comminuting the fleshings and trimmings, passing the same through a confined passageway, and agitating the same simultaneously to prevent the particles from coalescing. Thereafter, the particles are screened, and the remaining solids passed into means for pressing the same. Subsequently, all of the output is passed into means for retaining the same, and heating the same, while introducing water or other fluid on which the fat will float in order to separate the fat from the particles. Thereafter, the fat product may be dried in an additional step.

12 Claims, 1 Drawing Figure

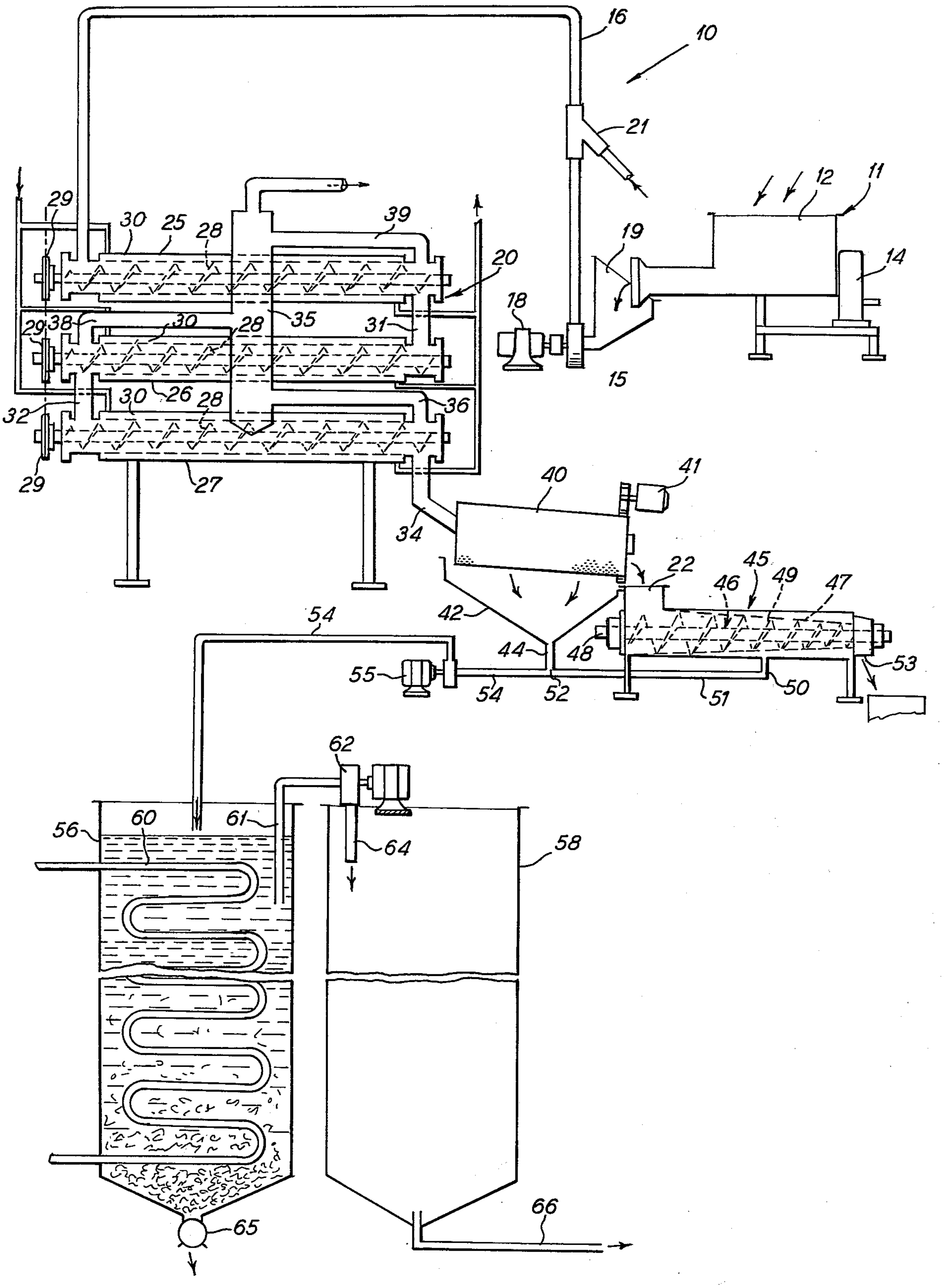
16
10
21
12
11
29
30
25
28
39
19
20
14
18
29
38
30
28
35
31
15
32
30
26
28
36
29
27
40
41
34
22
45
46
49
47
42
44
48
54
55
54
52
51
50
53
62
56
60
61
64
58
65
66

FAT RECOVERY SYSTEM

FIELD OF THE INVENTION

The present invention relates generally to systems and methods for rendering fat from the fleshings and trimmings of hides, whether hog hides, steer hides, or any other type hide, a significant portion of such fleshings and trimmings containing entrapped fat to be recovered.

DESCRIPTION OF THE PRIOR ART

Fat and fleshings heretofore have been rendered by cooking in heated vessels, with some agitation in order to promote the separation of the fat from the fleshings or trimmings. The particulate residue is then screened, sieved, or otherwise physically removed from the rendered fat, and thereafter the fat is combined with water in order to stratify the same for separation. In such methods or systems, there is a distinct possibility that the particulate material will coalesce, and form larger clods of solids. The larger the particle of solid, particularly if much more than $\frac{3}{8}$ inch to $\frac{1}{2}$ inch, the more fat remains entrapped, and the more difficult it is to remove the fat by applying heat. At temperatures significantly above that of boiling water, the fat may change in its consistency, or composition, and the particulate solids tend to cook and burn, thus contaminating the pure fat.

SUMMARY

A fat recovery system and method is disclosed in which the fleshings and trimmings are first comminuted by a grinder, preferably to a size approximating $\frac{3}{8}$ inch. Thereafter the same are passed through a cooker having at least one steam jacketed tube with an interior screw conveyor, the purpose of the latter being to move the particulate material through the cooker and at the same time agitate the particulate material to an extent that coalescence is significantly reduced, and the particulate integrity of the ground fleshings and trimmings is maintained. Thereafter the particulate material is separated from the fat by delivering the output of the cooker to a screen, preferably a cylindrical rotary screen. The fat drops into a collector, and the particulate material into a press, with the liquid output of the press being delivered into the fat conduit and the same conveyed to a settling tank. The settling tank is heated, while water is introduced, to maintain the fat in a floating condition above the water while the particulate material settles. Thereafter means may be provided for draining the water and remaining particulate material, and optionally transferring the fat to a further receptacle for drying. The method comprises essentially the steps of fat recovery from fleshings and trimmings which included comminuting the same to a particle size, preferably $\frac{3}{8}$ inch, cooking the same while agitating in a longitudinal path to maintain the particulate integrity of the fleshings and trimmings, and thereafter screening or sieving the particulate material into a press, and diverting the fat to a conduit. Subsequently, most of the particulate material is removed from the press and the fat produced by pressing is delivered to a settling area, heated, and mixed with water so that the fat will float. Subsequently the fat is removed and dried for storage and shipment, and the remaining particulate material may be recycled, or dried and disposed of as protein.

It is a principal object of the present invention to provide a fat recovery system and method which removes essentially all of the fat from fleshings and trimmings, and in addition, dries the remaining particulate material to the end that it can be processed for use as a source of protein, or otherwise disposed of.

A related object of the present invention is to provide a fat recovery system including a plurality of tubular cookers having logitudinal conveyors which maintain the particulate integrity of the fleshings and trimmings while the same is cooked to remove the fat.

Still another object of the present invention is to provide a fat recovery system and method which reduces any tendency to produce noxious odors and fumes, and at the same time results in an economical recovery of the fat product, as well as the particulate material.

Still another object of the present invention is to provide a fat recovery system for hide fleshings and trimmings which is economical to construct, simple to monitor in its operation, and readily controllable with simple instrumentation, and routine observation by an operator.

Yet another object of the present invention is to provide a fat recovery system and method which is susceptible of batch operation, and in which the start-up and operating expenses are minimized due to the utilization of steam, and electrical motors as the sole source of independent applied energy.

Yet another object of the present invention is to provide a fat recovery system for hide fleshings and trimmings, the operation and use of which produces a fat which has not been subjected to unduly elevated temperatures, and thus pure in form, and similarly produces a concentrated protein form of fleshings and trimmings which are readily marketable.

Yet another important object of the present invention is to provide a fat recovery system and method which involves a minimal amount of fine tolerances, thereby permitting the transport and the settling of dirt, ofal, and other contaminants at the settling terminus of the system and method to thereby cleanse the ultimate fat product.

DESCRIPTION OF DRAWINGS

Further objects and advantages of the present invention will become apparent as the following description of an illustrative embodiment proceeds, taken in conjunction with the accompanying drawings in which:

FIG. 1 is a flow sheet showing the sequential elements employed in the system and the steps embodied in the method.

DESCRIPTION OF PREFERRED SYSTEM

The subject recovery system 10, as shown in its entirety diagrammatically in FIG. 1, presupposes a hide from which the flesh and trimmings have been collected. This may be accomplished in standard scraping, skinning, and other techniques. The hides may be fresh or cured. The recovery system 10 begins with a grinder 11, having a grinder hopper 12 into which the fleshings and trimmings are introduced. The grinder is selected from that type of grinder available to insure that the particulate size of the fleshings or timmmings is reduced to $\frac{3}{8}$ inch or less prior to delivering the same into the output. A typical grinder motor 14 and grinder pump 15 drive the unit, with the exhaust or discharge portion of the grinder 11 dropping into a pump hopper 19. Thereafter the pump motor 18 and grinder pump 15 drives the discharged material through the particulate conduit 16, and towards the cooker 20. A steam inlet 21 is provided in the particulate conduit 16 on the discharge side of the grinder pump 15. Generally a ½ inch or ¾ inch stem inlet pipe is sufficient however, the size and number of steam inlets is dependent upon the distance and quantity of the material to be pumped. The steam inlet is injected at substantially at 45° angle with the particulate conduit 16 so that the steam will assist in driving the particulate raw material to the cooker 20 as well as preheating the same.

The cooker 20, as noted in the upper left hand portion of FIG. 1, is shown as comprising an upper steam tube 25, a middle steam tube 26, and a lower steam tube 27. Interiorly of each of the steam tubes 25, 26, 27, a half pitch screw conveyor 28 is positioned, having its own screw conveyor drive 29. The half pitch screw conveyors or augers are commercially available as manufactured by Screw Conveyor Pacific Co., Visalia, California. Steam jackets 30 are provided in surrounding cylindrical relationship to the interior portion of the steam tubes 25, 26, 27, said steam jackets normally carrying a dry steam from a conventional boiler at approximately 90 psig and 320° F. A pressure relief valve and condensate drain (not shown) is also normally provided. The pressure and temperature of the steam can be varied such that proper cooking of the particulate material occurs without undue waste of steam. The steam jacket and tubes are commercially available as manufactured by Canal Boiler Works, Seattle, Washington. A clearance is provided between the half pitch screw conveyor 28 and the interior of the steam tube to permit relief for the passage of contaminants such as sand, clay, ofal, residual hair, and the like. A screw conveyor drive 29 is provided at the end of each of the half pitch screw conveyors 28 so that the same are driven at substantially the same speed of rotation.

To be noted is the provision of an upper transfer tube 31 from the upper steam tube 25 to the middle steam tube 26. The upper transfer tube 1 conveys the cooked material from the upper steam tube 25 into the middle steam tube 26. In the middle steam tube 26, the particulate material is continually cooked but moves in a direction contra to the direction of the upper steam tube 25. After passing through the middle steam tube 26, a lower transfer tube 32 is encountered which drops the thus cooked product into the lower steam tube 27. Because the upper, middle, and lower steam tubes 25, 26, 27 are oriented in vertical fashion, a single exhaust manifold 35 is provided in coupled relationship to each of the steam tubes 25, 26, 27 to vent the interior to atmosphere. By the time the particulate has passed through the three steam tubes 25, 26, 27, the same is discharged by fluid gravitation flow through the discharge tube 34 into the rotary screen 40. Prior to the discharge, it will be noted that the lower exhaust feed 36 is adjacent the discharge tube 34 and immediately thereabove, leading into the exhaust manifold 35. In addition, a middle exhaust feed 38, and upper exhaust feed 39, are provided at ends of the respective steam tubes 25, 26, 27. Preferably the exhaust feeds 36, 38, 39 are provided at the discharge portion of the steam tubes 25, 26, 27 so that they do not interfere with the feed tube to the particular steam tube.

The rotary screen 40 is driven by means of the screen drive 41, and positioned to rotate along a generally horizontal axis, with the axis sloping downwardly at an accute angle with the horizontal to the end that the particulate material will be transported across the rotary screen 40. The size of the rotary screen 40 varies with the desired production. A standard commercially available size is 15 inches diameter, 48 inches long and 12–15 mesh. A vibrating screen with 50–60 mesh and 48 inches diameter could also be used, which is commercially available from Sweco Manufacturing, Los Angeles, California. The fat which drains drops into the screen hopper 42. At the lower portion of the screen hopper 42, provision is made for a screen hopper fat discharge 44 which connects at a fat connector 52 to the mixed discharge conduit 54. The balance of the particulate matter passing through the rotary screen 40 drops into the press hopper 22. The press 45 has an interior press auger 46 with a decreasing pitch diameter, and optionally a decreasing pitch. The same is driven by a press auger drive 48 to carry the particulate material through the press. The fat and water is extruded through slots in a cone 47 which encompases the auger 46. The slots are approximately 0.003 inch wide, ½ inch long, ⅜ inch apart, and cover the entire cone. The cone is generally made of 3/16 inch stainless steel; however, other materials could be used. The solids are conveyed to the end of the press and are discharged at a press solid discharge point 53. The tapered auger flights 49, as commented upon, have a decreasing pitch diameter and optionally a decreasing flight proportion. The fat and water extruded by the press 45 then drops down through the liquid press discharge 50 into a press discharge conduit 51 and thence to the fat connector 52 and onwardly through the mixed discharge conduit 54 to the discharge pump 55. The discharge pump 55 carries the combination of remaining solids, fat and water continuing through the mixed discharge conduit 54 into the settling tank 56. Thereafter the product can be transferred into the drying tank 58 as will be described hereinafter.

A preferably convoluted steam coil 60 is positioned interiorly of the settling tank 56, and heated to a temperature somewhere between 180° F and 200° F. In this manner the settling tank 56 is heated as it is being filled. If separation of the fat and water has taken place, the steam coil 60 is turned off. If separation has not yet taken place, the steam coil 60 is left on until it does. The steam coil 60 thus maintains the fat in a liquid condition, and thereafter as water is introduced into the settling tank 56, the particulate material will drop to the lower portion where it can be removed at the settling tank discharge 65, and in the meantime the fat separates and floats above the water at the lower portion of the settling tank 56. The particulate material removed at the settling tank discharge 65 are recycled by being mixed with the raw materials going into the cooker.

Once the fat has adequately settled from the particulate material and floated upon the water, a fat transfer tube 61 is lowered into the settling tank 56, and the fat transfer pump 62 activated to transfer the fat through the fat transfer discharge 64 into the drying tank 58. The drying tank 58 may be optionally heated by an additional steam coil as with the steam coil 60 in the settling tank 56, or otherwise agitated or treated to remove residual water from the fat. The purpose of the drying tank 58 is to remove any excess moisture through evaporation. Thereafter the fat contained in the drying tank 58 is diverted by means of the fat discharge 66 into permanent storage, or packaging, or other containerization for shipment, or optionally for further processing.

The process is designed to be most efficiently operated as a continuous process up to the settling tanks where some retention time is required to allow the particulates to settle from the fat and water. The system can be designed for any desired capacity by increasing the equipment or adding equipment to an existing system.

A typical system using three steam tubes, each 10 inches in diameter by 10 feet long, will handle 7,000 to 8,000 pounds per hour of raw material. This amount of raw material would yield approximately 1,300 pounds of fat and 700 pounds of solids (wet bases) per hour. The amounts vary as they are dependent on the size, type of hides, and the amount of fleshings on the hides. The quality of the finished fat one could expect is basically:

| | |
|---|---|
| F.A.C. COLOR: | 3-5 |
| Titre: | 37° C |
| Free Fatty Acids: | .005% |

THE METHOD

The method of the present invention contemplates first removing fleshing and trimmings from a cured or fresh hide. The fleshings are then comminuted into a size less than ½ inch, preferably ⅛ inch. The means for comminuting are confined in such a fashion that any fat which is pressed from the particulate material at the time is confined and conveyed.

Thereafter, the particulate material is introduced into a cooker providing a longitudinal or horizontal passageway in constant agitation, subject to a temperature approximating that of live steam. The confinement, however, is provided with a further step in venting the same to atmosphere to prevent pressure build-up, or pressure cooking. Thereafter, the particulate material is separated from the thus rendered fat, and the particulate material further pressed to remove residual entrained fat.

A final step contemplates the transfer of the combined fat and particulate material into means for separating the same by water floatation, with the further imposed step of maintaining the fat portion at the upper portion of the settling means at a temperature between 180° F and 200° F to promote the settling, and to maintain the fat in the fluid state. Thereafter, the fat is transferred to a further confined area for drying, while the particulate material is removed by discharging the same with the water.

In review it will be seen that a fat recovery system has been shown and described for fleshings and trimmings of cured and fresh hides which constantly agitates particulate material to the end that a total cooking takes place removing the majority of the fat from the particulate material. In addition, however, the particulate material is further pressed to remove residual fat. Thereafter, a settling means separates the fat from the particulate material prior to final processing.

Although particular embodiments of the invention have been shown and described in full here, there is no intention to thereby limit the invention to the details of such embodiments. On the contrary, the intention is to cover all modifications, alternatives, embodiments, usages and equivalents of a fat recovery system as fall within the spirit and scope of the invention, specification and the appended claims.

What is claimed is:

1. A fat recovery system for hide fleshings and trimmings comprising, in combination, a grinder for comminuting material of fleshings and trimmings to a pre-determined particulate size maximum, a cooker having at least one steam jacketed tube with an interior screw conveyor, means for transferring the comminuted material of particulate fleshings and trimmings from the grinder to the cooker, said means comprising an inlet for introducing steam in the direction of flow to preheat and to assist in transferring said material from the grinder to the cooker, means for driving the screw conveyor to pass the material particulates through the steam jacketed tube while heating the same, discharge means for the comminuted material and separated fat from the steam jacketed tube, a screen receiving the discharged material and fat from the tube, fat collecting means to receive fat passed through the screen, a continuous screw press receiving the material particulates not falling through the screen to further press the particulates to further remove the fat into a common conduit with the fat discharged from the fat collecting means, a discharge means at substantially the end of the press to remove the residue particulates and a heated settling reservoir receiving the fat and residue particulates whereby water may be introduced into the settling reservoir to float the fat on top and wash the particulates to a lower portion of the settling reservoir.

2. In the system of claim 1, at least three such steam jacketed tubes connected in series.

3. In the system of claim 2, said tubes being horizontally disposed in a vertical tier to provide for passage of the particulates being cooked from top to bottom.

4. In the system of claim 1, said screen being a driven rotary cylindrical member driven along an axis at an acute angle with the horizontal.

5. In the system of claim 1, a drying tank, and means for transferring fat from the upper portion of the settling tank to the drying tank.

6. In the system of claim 1, exhaust means coupled to said jacketed tube whereby the interior of the tube is vented to the atmosphere while cooking and particulate transfer proceeds.

7. In the system of claim 1, said press having a decreasing pitch auger and a tapering mating sidewall portion.

8. In the system of claim 1, means for recirculating the fines from the settling tank back into the cooker to further separate the fat from the other materials in the fines.

9. A fat recovery system for hide fleshings and trimmings comprising, in combination, a grinder for comminuting material of fleshings and trimmings to a predetermined particulate size maximum, a cooker having at least one steam jacketed tube with an interior screw conveyor, means for transferring the comminuted material of particulate fleshings and trimmings from the grinder to the cooker, said means comprising an inlet for introducing steam in the direction of flow to preheat and to assist in transferring said material from the grinder to the cooker, means for driving the screw conveyor to pass the material particulates through the steam jacketed tube while heating the same, discharge means for the comminuted material and separated fat from the steam jacketed tube, a moving screen receiving the discharged material and fat from the tube and permitting water and other fluids to pass directly into the settling reservoir, a press receiving the material particulates not falling through the screen to further press the particulates to separate fat from the same, a discharge means at substantially the end of the press to remove the residue particulates, a heated settling reservoir receiving the fat and residue particulates, and means for recirculating the fines from the settling tank, whereby further fat may be separated from the fines, and the polluting effect from disposing of such fines is minimized as the same will ultimately separate into fat and particulate material, the latter being processed by the press.

10. In the system of claim 9, said screen being a driven rotary cylindrical member driven along an axis at an acute angle with the horizontal.

11. In the system of claim 9, a drying tank, and means for transferring fat from the upper portion of the settling tank to the drying tank.

12. In the system of claim 9, exhaust means coupled to said jacketed tube whereby the interior of the tube is vented to the atmosphere while cooking and particulate transfer proceeds.

* * * * *